United States Patent
Parnell

(10) Patent No.: US 7,093,935 B2
(45) Date of Patent: Aug. 22, 2006

(54) MULTIFOCAL POLARIZED SUNGLASSES AND LENSES

(76) Inventor: Stuart A. Parnell, 138 Myrtlewood La., Mobile, AL (US) 36608

( * ) Notice: Subject to any disclaimer, the term of this patent is extended or adjusted under 35 U.S.C. 154(b) by 0 days.

(21) Appl. No.: 10/931,330

(22) Filed: Sep. 1, 2004

(65) Prior Publication Data

US 2006/0050225 A1   Mar. 9, 2006

(51) Int. Cl.
*G02C 7/12* (2006.01)
*G02C 7/02* (2006.01)

(52) U.S. Cl. .................. 351/49; 351/61; 351/164; 351/177

(58) Field of Classification Search .............. 351/44, 351/49, 61, 159, 163, 164, 177
See application file for complete search history.

(56) References Cited

U.S. PATENT DOCUMENTS

| | | | | |
|---|---|---|---|---|
| 3,966,311 A | * | 6/1976 | Korn et al. ............... | 351/164 |
| 4,846,913 A | * | 7/1989 | Frieder et al. ............ | 156/242 |
| 5,351,100 A | * | 9/1994 | Schwenzfeier et al. ..... | 351/164 |
| 5,790,227 A | | 8/1998 | Rorabaugh | |
| 6,145,984 A | * | 11/2000 | Farwig ..................... | 351/49 |
| 6,196,678 B1 | * | 3/2001 | Chapin, III ............... | 351/44 |
| 6,250,759 B1 | | 6/2001 | Kerns, Jr. et al. | |
| 6,604,823 B1 | * | 8/2003 | Hursey, Jr. ................ | 351/61 |
| 2002/0005932 A1 | | 1/2002 | Kerns, Jr. et al. | |

OTHER PUBLICATIONS

Harold A. Stein, Bernard J.Slatt, Raymond M. Stein; the Ophthalmic Assistant, A Guide for Ophthalmic Medical Personnel, Seventh Edition, Chapter 10, p. 228.
Optics Shop, 2003 websitehttp://www.perret-optic.ch/optometrie/correction_optique/Bifo/opto_correction_optique_bifo_gb.htm.
Action Optics Website http://www.actionoptics.com and the following particular pages.

* cited by examiner

Primary Examiner—Huy Mai

(57) ABSTRACT

Polarized sunglasses and lenses, and methods related thereto, are provided that include multifocal segments and which have a total thickness of less than about 5 millimeters.

15 Claims, 1 Drawing Sheet

MULTIFOCAL POLARIZED SUNGLASSES AND LENSES

TECHNICAL FIELD OF THE INVENTION

This invention relates generally to eyeglasses, and more particularly to multifocal polarized sunglasses and lenses.

BACKGROUND OF THE INVENTION

A wide range of sunglasses are available, including prescription sunglasses, polarized sunglasses, and multifocal sunglasses (such as those with bifocal segments).

Prescription lenses are generally made by grinding relatively thick lens blanks down to the shape needed for the prescriptions. Such lens blanks are often about 9 millimeters thick before grinding. Of course, because of this thickness, the lens cost is higher than that for thinner lens blanks.

Besides prescription uses, thick lens blanks have been used with polarizing films to create polarized lenses, they have been tinted for filtering, they have been made with bifocal segments for multifocal applications, and they have been used in applications that combine each of these. In each of these applications, significant costs and processing time are involved in grinding the lens blanks so that their thickness is suitable for wearing.

Thinner lens blanks, often referred to as "plano" lenses, are less expensive, and have a thickness of about less than 5 millimeters. Such plano lenses have been used with polarizing films to create polarized lenses, they have been tinted for filtering, and they have been made with bifocal segments for multifocal applications. However, to the inventor's knowledge, no plano lenses have been made with a multifocal segment (such as a bifocal) and polarization. Thus, a need has arisen for polarized sunglasses and lenses that include multifocal segments and which are made from thin lens blanks.

SUMMARY OF THE INVENTION

Therefore, in accordance with the teachings of the present invention, sunglasses, lenses, and methods related thereto are disclosed which overcome limitations associated with the prior art.

In particular, in one embodiment of the present invention, a method of making a sunglasses lens is provided that includes providing a bifocal segment, molding an outer lens layer around the bifocal segment, combining the outer lens layer with an inner lens layer and a polarizing layer to form a sunglasses lens blank, wherein the combined thickness of the outer lens layer, the inner lens layer, and the polarizing layer is less than about 5 millimeters without grinding of any of the layers, and edging the sunglasses lens blank to fit within a sunglasses frame.

In particular embodiments, the inner lens layer and the polarizing layer are combined before combining with the outer lens layer. In other embodiments, the combined thickness of the outer lens layer, the inner lens layer, and the polarizing layer is less than about 3 millimeters without grinding of any of the layers.

In other particular embodiments, the bifocal segment has a top that is positioned within the outer lens layer such that, when in use in the sunglasses frame, it is at least about 1 millimeter below the vertical level of the center of the lower limbus of a wearer's eye. In other embodiments, the bifocal top is positioned 5, 6, 7, or 8 millimeters below the vertical level of the center of the lower limbus of a wearer's eye. The bifocal top may be a flat top or a progressive top.

In some embodiments, the bifocal segment also includes a trifocal segment having a trifocal top, positioned at least about 1 millimeter below the vertical level of the center of the lower limbus of a wearer's eye. The trifocal top may be a flat top or a progressive top.

In another embodiment, sunglasses are made by the process that includes providing a pair of polarized lens blanks, wherein each of the polarized lens blanks includes a bifocal segment, and wherein each of the polarized lens blanks has a thickness of less than about 5 millimeters without grinding, providing a sunglasses frame, edging the polarized lens blanks to fit within the sunglasses frame, and setting the edged polarized lens blanks in the sunglasses frame. In some particular embodiments, each of the polarized lens blanks has a thickness of less than about 3 millimeters without grinding.

In another particular embodiment, the polarized lens blanks are provided by providing the bifocal segment, molding an outer lens layer around the bifocal segment, combining the outer lens layer with an inner lens layer and a polarizing layer to form the polarized lens blank, wherein the combined thickness of the outer lens layer, the inner lens layer, and the polarizing layer is less than about 5 millimeters without grinding of any of the layers.

In still another embodiment, each bifocal segment has a bifocal top positioned at least about 1 millimeter below the vertical level of the center of the lower limbus. In other embodiments, the bifocal top is positioned 5, 6, 7, or 8 millimeters below the vertical level of the center of the lower limbus of a wearer's eye. The bifocal top may be a flat top or a progressive top.

BRIEF DESCRIPTION OF THE DRAWINGS

Reference is made in the description to the following briefly described drawings, wherein like reference numerals refer to corresponding elements.

DETAILED DESCRIPTION OF THE INVENTION

U.S. patent application Ser. No. 10/720,879, entitled Multifocal Sunglasses, Glasses, and Lenses, and filed on Nov. 24, 2003, is herein incorporated by reference, in its entirety.

Figure 1:
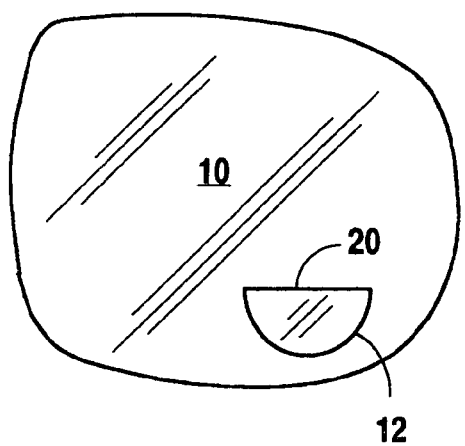
FIG. 1 illustrates a front view of one embodiment of a lens according to the teaching of the present invention.
Figure 2:
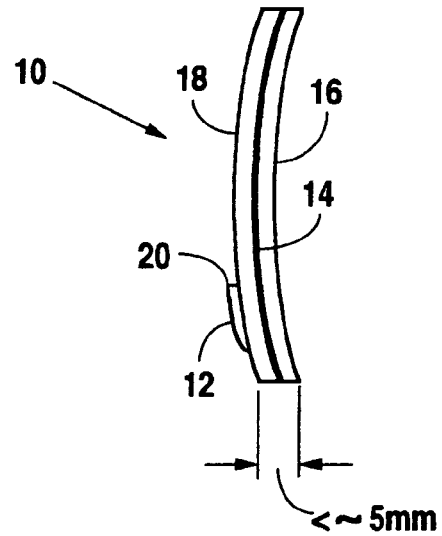
FIG. 2 illustrates a side view of one embodiment of a lens according to the teaching of the present invention.

FIGS. 1 and 2 illustrate a particular embodiment of a lens according to the teachings of the present invention. As shown, lens 10 includes a bifocal segment 12, a polarizing layer 14, an inner lens layer 16, and an outer lens layer 18.

The thickness of the lens 10 (the combined thickness of each of the layers where layers are used) is less than about 5 millimeters, and more preferably less than about 3 millimeters, without grinding. In a particular application, the lens thickness is about 2.2 millimeters.

Although multiple layers are shown in the FIGURES, it is not necessary that there be multiple layers—that is, the lens may be a single layer polarizing lens. Also, similarly, the present invention is meant to cover embodiments where there is only a single lens layer and a polarizing layer.

The bifocal segment 12 may be part of the outer lens layer 18, but also may be a separate piece attached (such as by, without limitation, adhesion) to the outer lens layer 18. In a preferred embodiment, outer lens layer 18 is molded around the bifocal segment 12.

In some embodiments, the bifocal segment 12 may protrude from the outer lens layer 18. Any such protrusion is not included in determining the thickness of the lens 10. Of course, the bifocal segment 12 could be part of or attached to the inner layer 16, or located between the layers.

The polarizing layer 14 may be any kind of polarizer, such as, without limitation, a laminated film or a film that is cast onto the inner lens layer 16 or the outer lens layer 18. As shown in the FIGURES, in a preferred embodiment the polarizing layer 14 is located between the inner lens layer 16 and the outer lens layer 18.

The bifocal segment 12 shown in FIGS. 1 and 2 includes a top 20. The position of the bifocal segment 12 and its top 20 may be located as desired for the particular application. However, in a particular embodiment, the position of the top 20 may be located from just below the level of the center of the lower limbus of a wearer's eye to a position as low as desired for the particular application. For example, without limitation, the top 20 in one embodiment may be located about one millimeter or more below the level of the center of the lower limbus. In other particular embodiments, the top 20 may be located, without limitation, at least about 5, 6, 7, or 8 millimeters below the level of the center of the lower limbus.

Figure 3:
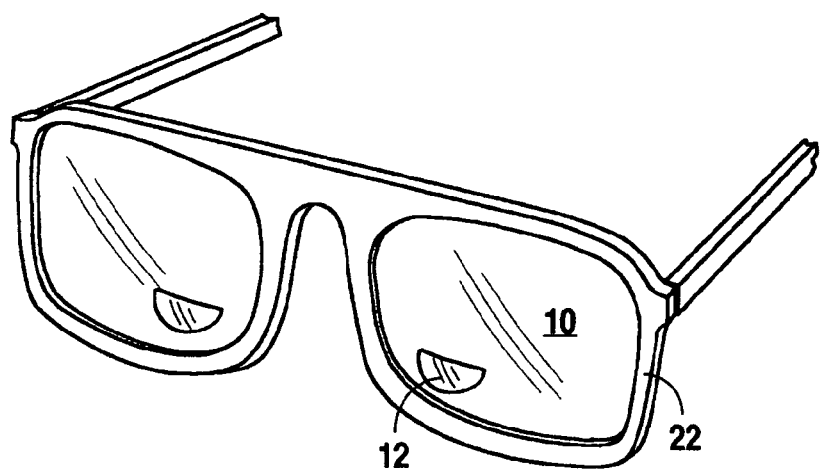
FIG. 3 illustrates one embodiment of a pair of sunglasses according to the teachings of the present invention.

FIG. 3 shows part of a frame 22, to illustrate that a pair of lenses may be set in frames to make a pair of sunglasses. Before being set in the frames, the lenses are edged to fit the frames.

Although the above discussion is in connection with a bifocal segment 12 that includes a flat top 20, the present invention is not limited to such embodiments. For example, without limitation, multifocal (such as bifocal or trifocal) segments that have progressive tops—i.e., those that do not have a flat top—may also be used. The location of such segments may be as described above in connection with top 20.

The terms bifocal segment, trifocal segment, and multifocal segment are meant to indicate that part of a lens which focuses light differently than other parts of the lens. Without limitation, such segments may be magnifying segments. For example, although any power may me used, without limitation, bifocal segments have magnification powers in the range of 0.75 to 4.00 may be used. The lenses, including the multifocal segments and any lens layers, may be made of any suitable material, including, without limitation, glass, plastic (such as, without limitation CR-39), acrylic, and polycarbonate, among others. Any suitable lens blank diameter or curvature may be used. Also, without limitation, the lenses may be, if desired, colored, such as by, without limitation, tinting, coating, or dyeing. Also, without limitation, the lenses may be coated with reflective coatings.

By combining polarization and multifocal segments in a relatively thin lens, significantly lower costs are achieved, thus providing an important improvement over the prior art. In particular, besides lower materials costs, the time and effort expended in grinding thick lenses down to wearable thicknesses is eliminated with the present invention. Once the lenses are made, they need only be edged to fit the frames in which the will be used. With theses cost improvements, the advantages of polarization and multifocal viewing can be made more readily available to a larger number of people. And, with the widespread popularity of outdoor activities, this availability is important.

The embodiments with relatively low positions of the multifocal segments provide important advantages in, among other activities, outdoor activities. For example, in hunting, fishing, and field sport spectating, wherein long distance viewing is desirable at many different sight angles, and a bifocal segment, for example, in the normal position can be distracting. By lowering the bifocal segment, the wearer of the lens may tie knots, read maps and depth charts, look at gauges, read sports programs, read manuals and in general focus on near items through the bifocal segment, but yet have a wide range of sight angles that do not pass through the bifocal segment.

The particular descriptions provided above are illustrative examples, and features and advantages of each example may be interchanged with, or added to the features and advantages in the other embodiments and examples herein. And, in general, although the present invention has been described in detail, it should be understood that various changes, alterations, substitutions, additions and modifications can be made without departing from the intended scope of the invention, as defined in the following claims.

What is claimed is:

1. A method of making a sunglasses lens, comprising:
   providing a bifocal segment;
   molding an outer lens layer around the bifocal segment;
   combining the outer lens layer with an inner lens layer and a polarizing layer to form a sunglasses lens blank, wherein the combined thickness of the outer lens layer, the inner lens layer, and the polarizing layer is less than 5 millimeters without grinding of any of the layers; and
   edging the sunglasses lens blank to fit within a sunglasses frame.

2. The method of claim 1, wherein the inner lens layer and the polarizing layer are combined before combining with the outer lens layer.

3. The method of claim 1, wherein the combined thickness of the outer lens layer, the inner lens layer, and the polarizing layer is less than about 3 millimeters without grinding of any of the layers.

4. The method of claim 1, wherein the sunglasses lens is for use by a wearer having an eye with a lower limbus, the lower limbus having a center at a vertical level, and wherein the bifocal segment has a bifocal top, and further comprising positioning the bifocal segment within the outer lens layer such that, when in use in the sunglasses frame, the bifocal top is at least about 1 millimeter below the vertical level of the center of the lower limbus.

5. The method of claim 4, wherein positioning comprises positioning the bifocal segment within the outer lens layer such that, when in use in the sunglasses frame, the bifocal top is at least about 5 millimeter below the vertical level of the center of the lower limbus.

6. The method of claim 4, wherein the bifocal top of the bifocal segment is a flat top.

7. The method of claim 4, wherein the bifocal top of the bifocal segment is progressive.

8. The method of claim 1, wherein the bifocal segment also includes a includes a trifocal segment having a trifocal top, and wherein the sunglasses lens is for use by a wearer having an eye with a lower limbus, the lower limbus having a center at a vertical level, and further comprising positioning the trifocal segment such that, when in use in the sunglasses frame, the trifocal top is at least about 1 millimeter below the vertical level of the center of the lower limbus.

9. The method of claim 8, wherein the trifocal top is a flat top.

10. The method of claim 8, wherein the trifocal top of the trifocal segment is progressive.

11. A process for making sunglasses, comprising:
provide a pair of polarized lens blanks, wherein each of the polarized lens blanks includes a bifocal segment, and wherein each of the polarized lens blanks has a thickness of less than 5 millimeters without grinding;
providing a sunglasses frame;
edging the polarized lens blanks to fit within the sunglasses frame; and
setting the edged polarized lens blanks in the sunglasses frame.

12. The process of claim 11, wherein each of the polarized lens blanks has a thickness of less than about 3 millimeters without grinding.

13. The process of claim 11, wherein providing the pair of polarized lens blanks comprises, for each of the polarized lens blanks:
providing the bifocal segment;
molding an outer lens layer around the bifocal segment;
combining the outer lens layer with an inner lens layer and a polarizing layer to form the polarized lens blank, wherein the combined thickness of the outer lens layer, the inner lens layer, and the polarizing layer is less than 5 millimeters without grinding of any of the layers.

14. The process of claim 13, wherein the sunglasses are for use by a wearer having an eye with a lower limbus, the lower limbus having a center at a vertical level, and wherein the each bifocal segment has a bifocal top, and wherein the process further comprises, for each polarized lens blank, positioning the bifocal segment within the outer lens layer such that, when in use in the sunglasses frame, the bifocal top is at least about 1 millimeter below the vertical level of the center of the lower limbus.

15. The process of claim 14, wherein positioning comprises positioning the bifocal segment within the outer lens layer such that, when in use in the sunglasses frame, the bifocal top is at least about 5 millimeters below the vertical level of the center of the lower limbus.

* * * * *